US 7,174,288 B2

(12) United States Patent
Ju et al.

(10) Patent No.: US 7,174,288 B2
(45) Date of Patent: Feb. 6, 2007

(54) MULTI-MODAL ENTRY OF IDEOGRAMMATIC LANGUAGES

(75) Inventors: Yun-cheng Ju, Bellevue, WA (US); Hsiao-Wuen Hon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 10/142,572

(22) Filed: May 8, 2002

(65) Prior Publication Data

US 2003/0212563 A1 Nov. 13, 2003

(51) Int. Cl.
G06F 17/28 (2006.01)
(52) U.S. Cl. .................. 704/2; 704/8; 704/9; 704/246; 704/251
(58) Field of Classification Search .................... 704/8, 704/2, 10, 246, 251
See application file for complete search history.

(56) References Cited

U.S. PATENT DOCUMENTS

| 4,498,143 | A | * | 2/1985 | Strzelecki | .................... 715/535 |
| 4,679,951 | A | * | 7/1987 | King et al. | ................. 400/110 |
| 5,164,900 | A | * | 11/1992 | Bernath | ....................... 715/535 |
| 5,729,629 | A | | 3/1998 | Dai | ............................. 382/187 |
| 5,787,230 | A | * | 7/1998 | Lee | ............................. 704/235 |
| 5,952,942 | A | * | 9/1999 | Balakrishnan et al. | ......... 341/28 |
| 6,073,146 | A | * | 6/2000 | Chen | ........................... 715/535 |
| 6,104,317 | A | * | 8/2000 | Panagrossi | .................... 341/20 |
| 6,362,752 | B1 | * | 3/2002 | Guo et al. | ................... 715/535 |
| 6,822,585 | B1 | * | 11/2004 | Ni et al. | ........................ 341/28 |
| 2002/0069058 | A1 | * | 6/2002 | Jin et al. | ..................... 704/249 |

FOREIGN PATENT DOCUMENTS

CN 1277375 A 7/2000

OTHER PUBLICATIONS

Kim, Babagicho, Tezuka, et al., "Top-down extraction of strokes . . . ", Mar. 1990 vol. J73D-11, No. 3, pp. 297-304.
Odaka, et al. "On-line recognition . . . " Nov./Dec. 1982, SMC-12, No. 6, pp. 898-903.
Handling Diphthong and Triphone Symbols:Useful in Automatic English Text Generation from Pitman Shorthand Language Document Nagabhushan, P. Anami, B.S. Lecture Notes in Computer Science 2000 [NO] 1904, pp. 252-260.
X.Huang, A. Acero, F.Alleva, M.Hwang, L.Jiang, and M.Mahajan. "From Sphinx-II to Whisper—Making Speech Recognition Usable". Speech and Speaker Recognition-Advanced Topics, Kluwer Publisher, 1994.

* cited by examiner

*Primary Examiner*—Richmond Dorvil
*Assistant Examiner*—Leonard Saint-Cyr
(74) *Attorney, Agent, or Firm*—Steven M. Koehler; Westman, Champlin & Kelly, P.A.

(57) ABSTRACT

A method for inputting ideograms into a computer system includes receiving phonetic information related to a desired ideogram to be entered and forming a candidate list of possible ideograms as a function of the phonetic information received. Stroke information, comprising one or more strokes in the desired ideogram, is received in order to obtain the desired ideogram from the candidate list.

13 Claims, 9 Drawing Sheets

MULTI-MODAL ENTRY OF IDEOGRAMMATIC LANGUAGES

BACKGROUND OF THE INVENTION

The present invention relates to data processing systems. More particularly, the present invention relates to the input of a written language having ideograms such as Chinese and Japanese into a computer system.

The input of non-phonetic or non-alphabetic languages having ideograms into a computer system can be time-consuming and cumbersome. (As is known and as used herein "ideograms", which are also known as "logograms" or "logographic", are symbols that represent a word in a written language, as opposed to using phonemes or syllables to construct words from their component sounds.) One commonly used system is often referred to as IME (Input Method Editor), which is sold by Microsoft Corporation of Redmond, Wash. In this system, phonetic symbols are provided to a computer using a standard keyboard. The computer includes a converter module that converts the phonetic symbols to the selected language. For example, it is common to form Japanese text in a computer system by entering phonetic characters from an English or Latin keyboard. Inputting Japanese phonetic characters using the letters of the Latin alphabet is called "Romaji". The computer system compares each of the Romaji characters with a stored dictionary and produces a "Kana" sequence (Kanas). Kanas are Japanese syllabic symbols that represent the sound of Japanese. The IME converter then converts the Kana formed into "Kanji" form, which is a formal Japanese writing language, through sophisticated linguistic analysis (the formal Japanese writing system actually consists of a mixture of Kanjis and Kanas, where the Kanjis represent most of the content information and bear no direction information about pronunciation).

However, in a conventional text processing system used in a Japanese word processor such as the IME system discussed above, the appropriate Kanji equivalent for the Kana sequence often must be selected or corrected using a so-called candidate display-and-choice method. Specifically, a number of Kanji candidates are displayed for a sequence of Kana so that the user can choose the appropriate one. This display-and-choice method is necessary since the Japanese language includes a number of homonyms and no explicit word boundaries, which cause inevitable Kana to Kanji conversion errors. By displaying the Kanji candidates, the user can view the possible candidates and select the appropriate Kanji representation.

Similarly, the text editing module used in Chinese word processors or other Chinese language processing systems also requires IME conversions, which convert from phonetic symbols (Pinyin) to the written Hanzi representations. Pinyin IME is the most popular phonetic Chinese IME and operates similar to the Japanese Kana IME discussed above. Generally, phonetic Pinyin string information is converted to Hanzi through the use of a Pinyin dictionary and language models. The lack of tone marks in Pinyin IME can cause far more homonyms to occur than with Japanese Kana IME. Often the list of homonyms for some Pinyin sequences can be too long to fit on the entire screen of the visual display.

Recently, speech recognition has been used in these systems, which naturally provide phonetic information previously inputted through the keyboard. However, the homonym problem discussed above still exists. In addition, speech recognition errors can be made during conversion, which may require even more use of the candidate display-and-choice method in order to obtain the correct ideogram.

Accordingly, there is an on-going need to more effectively and efficiently implement a system to obtain the written symbols for languages such as Chinese and Japanese having ideograms.

SUMMARY OF THE INVENTION

A method for inputting ideograms into a computer system includes receiving phonetic information related to a desired ideogram to be entered and forming a candidate list of possible ideograms as a function of the phonetic information received. Stroke information is received in order to obtain the desired ideogram from the candidate list. Stroke information comprises one or more strokes in the desired ideogram. This manner of obtaining a desired ideogram is "multimodal" in that two different, substantially uncorrelated types of information (phonetic and stroke) are used to locate the desired ideogram or symbol.

Inputting ideograms in this manner is particularly useful when it is necessary to correct an ideogram automatically selected by a text editing system or word processing system, where phonetic information is provided by speech recognizer. Commonly, the ideogram automatically selected by the system is the ideogram with the highest probability in the candidate list. Using the stroke information, ideograms from the candidate list are removed when the ideogram does not have the stroke(s) that the user has indicated is present in the desired ideogram or symbol. By repeatedly entering in strokes of the desired ideogram, the use can reduce the candidate list. In this manner, the user need not enter all of the strokes for the desired ideogram, but rather, only a number of strokes sufficient so as to identify the desired ideogram from the candidate list.

If in the event the initial candidate list is reduced to zero without the user locating the desired ideogram or symbol, additional ideograms or symbols can be added to the candidate list as a function of the stroke information so far received. This is another aspect of the present invention. In this manner, the user need not reenter stroke information in order to find the desired ideogram, which provides a smooth transition from the ideograms or symbols based on the phonetic information to ideograms and symbols based solely on stroke information.

DETAILED DESCRIPTION OF THE PREFERRED EMBODIMENTS

Figure 1:
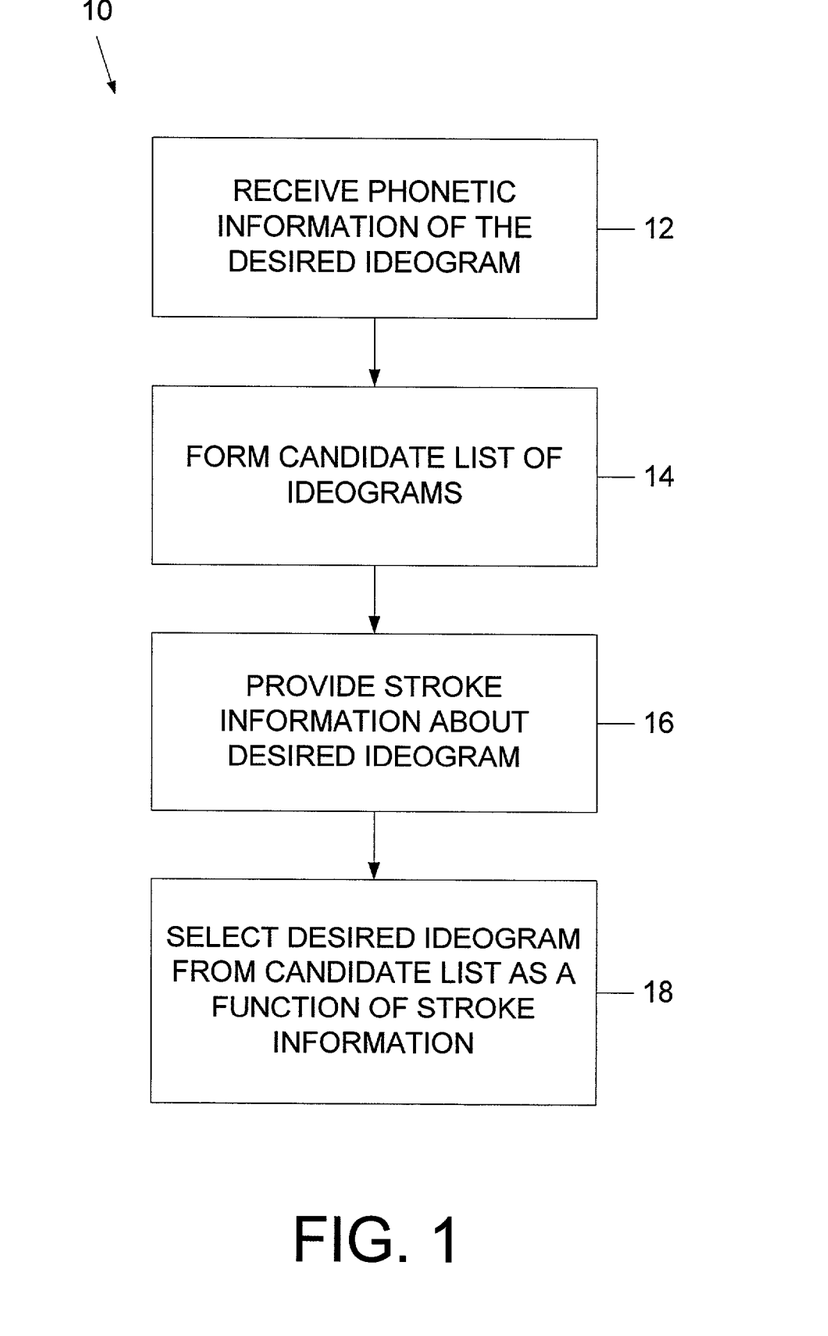
FIG. 1 is a flow chart illustrating an aspect of the present invention.
Figure 9:
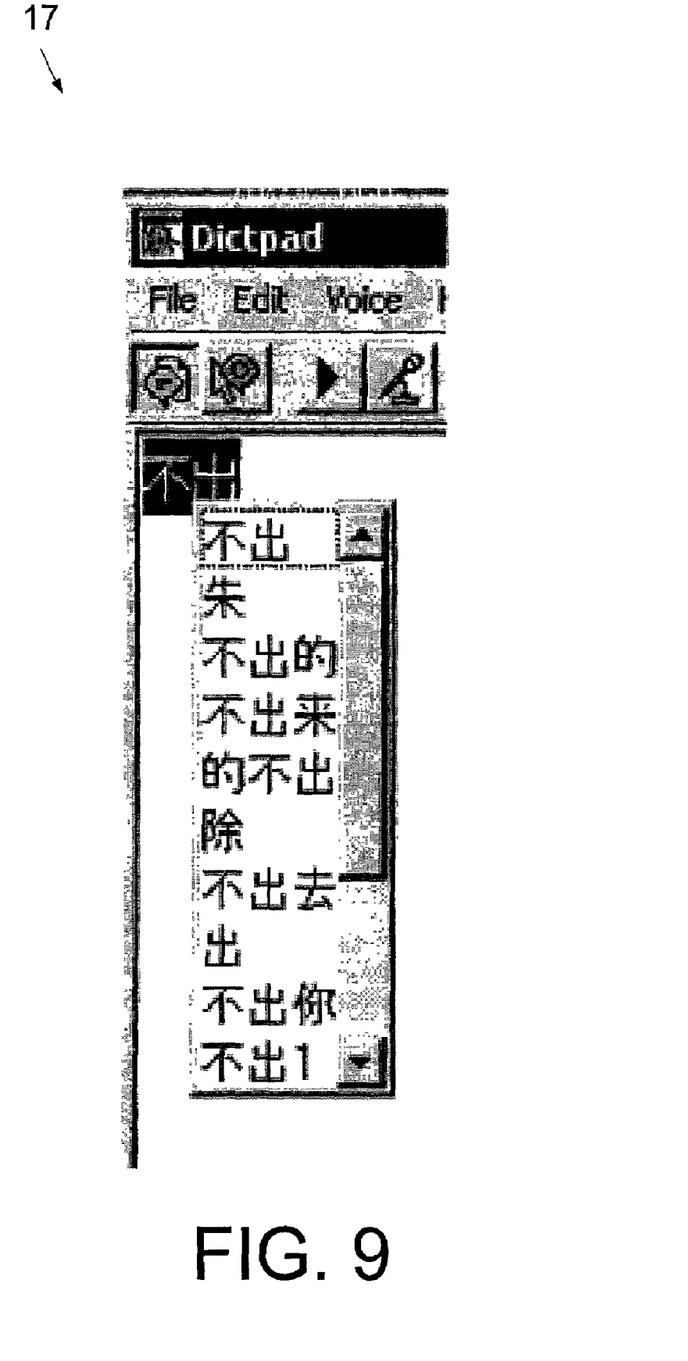
FIG. 9 is an exemplary candidate list.

Referring to FIG. 1, one aspect of the present invention is a method 10 of inputting ideograms in a computer system. The method 10 includes a step 12 of receiving phonetic information of the ideogram typically through a speech recognition system from a user and forming a candidate list of ideograms that may correspond to the phonetic information received at step 14. An example of a candidate list rendered on a display to a user is illustrated in FIG. 9 at 17. Commonly, the ideogram having the highest priority is chosen automatically and saved. However, in the event an error has been made in the automatic selection, the user can then provide "stroke" information of at least one stroke forming the correct ideogram at step 16. The stroke information is used by the computer system to obtain the desired ideogram from the candidate list at step 18.

Figure 2:
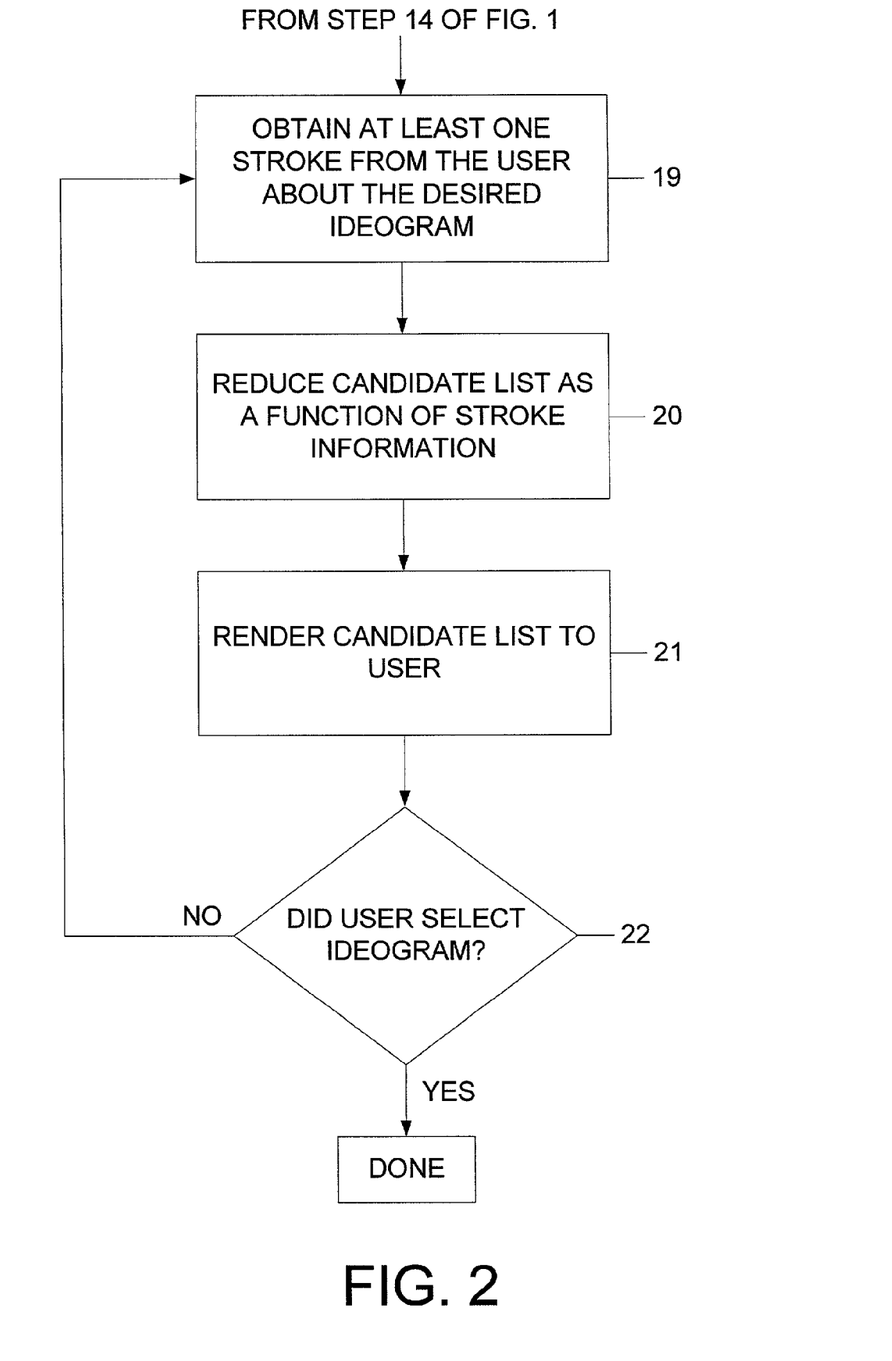
FIG. 2 is a flow chart illustrating a method of operation according to the present invention.

Referring to FIG. 2, providing stroke information and obtaining the desired ideogram can include repeating the steps of 19 through 22. Step 19 includes obtaining stroke information (i.e. one or more strokes contained in the desired ideogram) from the user. With the stroke information obtained from step 19 (and any additional stroke information from prior execution of step 19), the candidate list is narrowed at step 20 to include only those ideograms having the stroke information obtained from the user. The narrowed candidate list is rendered to the user at step 21. If the user identifies the desired ideogram at step 22, the selected ideogram is then saved; otherwise, the user can provide additional stroke information at step 19, repeating the process.

It should be noted that the stroke information is generally not correlated with the phonetic information, which allows the candidate list to be easily reviewed (e.g. reduced) to obtain the desired ideogram. In a system where letters of a desired word are entered in order to obtain the word, there exists a strong correlation between the letters and the phonetic sound made by the letters in the words. Thus, many letters, if not all of the letters, need to be entered in order to reduce a candidate list of words to identify a desired word. In contrast, by using stroke information that generally does not have a strong correlation to the phonetics of the ideogram, a desired ideogram can be quickly identified from a list of candidate ideograms that sound similar.

The method 10 described above can be implemented in any text editing module, which can take many forms. For instance, the text editing module can be an IME system as described in the background section above that receives phonetic information through speech and converts the phonetic information to a written language such as Japanese, Chinese, etc. In addition, the text editing module can be a word processing application or form part of a dictation system that receives input speech from the user through a microphone and converts the input speech to text.

Figure 3:
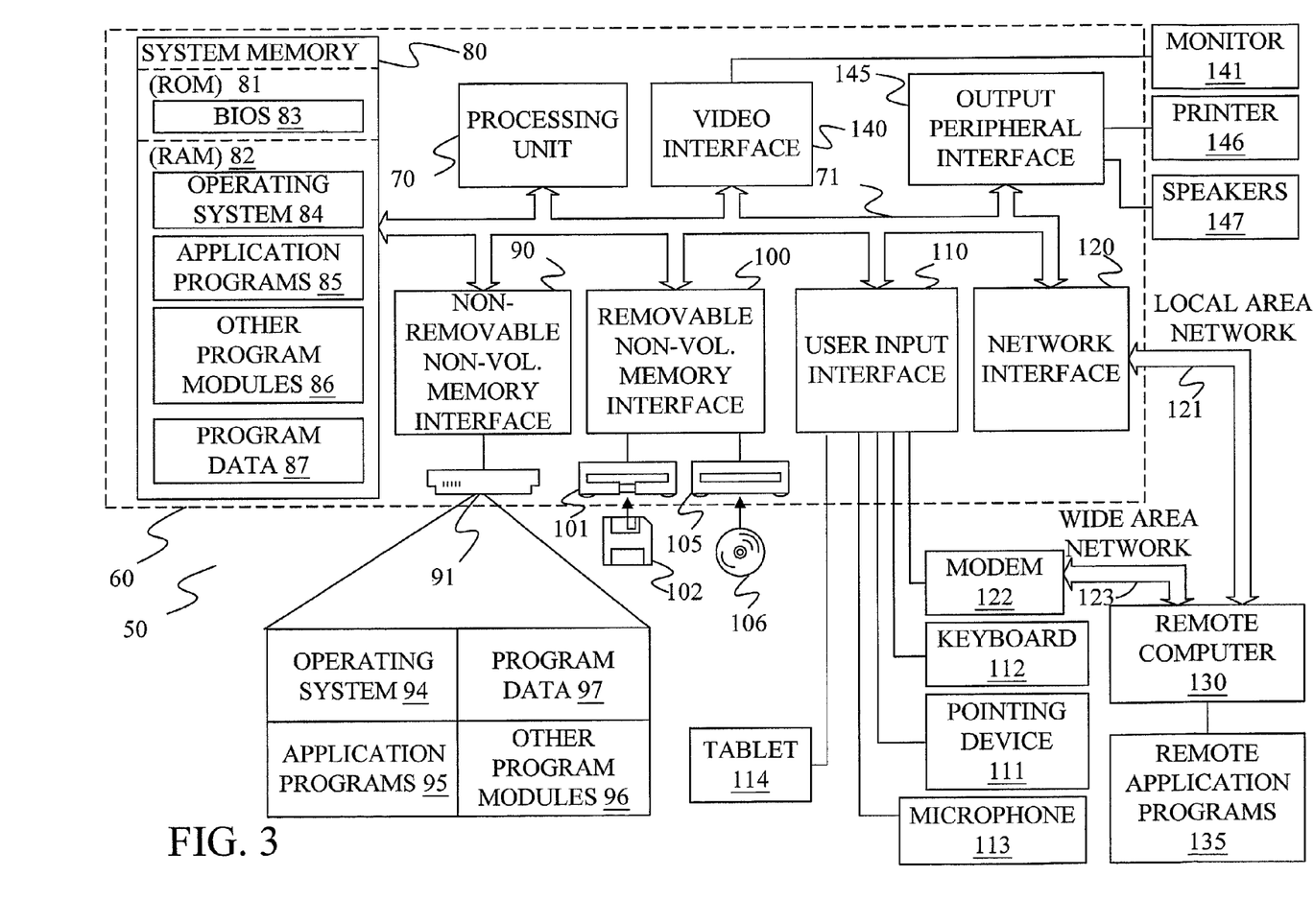
FIG. 3 is a block diagram of an exemplary environment for implementing the present invention.

Prior to a further detailed discussion of the present invention, an overview of an operating environment may be helpful. FIG. 3 illustrates an example of a suitable computing system environment 50 on which the invention may be implemented. The computing system environment 50 is only one example of a suitable computing environment and is not intended to suggest any limitation as to the scope of use or functionality of the invention. Neither should the computing environment 50 be interpreted as having any dependency or requirement relating to any one or combination of components illustrated in the exemplary operating environment 50.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 3, an exemplary system for implementing the invention includes a general-purpose computing device in the form of a computer 60. Components of computer 60 may include, but are not limited to, a processing unit 70, a system memory 80, and a system bus 71 that couples various system components including the system memory to the processing unit 70. The system bus 71 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 60 typically includes a variety of computer readable media. Computer readable media can be any available media that can be accessed by computer 50 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 50.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 80 includes computer storage media in the form of volatile and/or nonvolatile memory such as read only memory (ROM) 81 and random access memory (RAM) 82. A basic input/output system 83 (BIOS), containing the basic routines that help to transfer information between elements within computer 60, such as during start-up, is typically stored in ROM 81. RAM 82 typically contains data and/or program modules that are immediately accessible to and/or presently being operated on by processing unit 70. By way of example, and not limitation, FIG. 3 illustrates operating system 84, application programs 85, other program modules 86, and program data 87.

The computer 60 may also include other removable/non-removable volatile/nonvolatile computer storage media. By way of example only, FIG. 3 illustrates a hard disk drive 91 that reads from or writes to non-removable, nonvolatile magnetic media, a magnetic disk drive 101 that reads from or writes to a removable, nonvolatile magnetic disk 102, and an optical disk drive 105 that reads from or writes to a removable, nonvolatile optical disk 106 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 91 is typically connected to the system bus 71 through a non-removable memory interface such as interface 90, and magnetic disk drive 101 and optical disk drive 105 are typically connected to the system bus 71 by a removable memory interface, such as interface 100.

The drives and their associated computer storage media discussed above and illustrated in FIG. 3, provide storage of computer readable instructions, data structures, program modules and other data for the computer 60. In FIG. 3, for example, hard disk drive 91 is illustrated as storing operating system 94, application programs 95, other program modules 96, and program data 97. Note that these components can either be the same as or different from operating system 84, application programs 85, other program modules 86, and program data 87. Operating system 84, application programs 85, other program modules 86, and program data 87 are given different numbers here to illustrate that, at a minimum, they are different copies.

A user may enter commands and information into the computer 60 through input devices such as a keyboard 112, a microphone 113, a handwriting tablet 114, and a pointing device 111, such as a mouse, trackball or touch pad. Other input devices (not shown) may include a joystick, game pad, satellite dish, scanner, or the like. These and other input devices are often connected to the processing unit 70 through a user input interface 110 that is coupled to the system bus, but may be connected by other interface and bus structures, such as a parallel port, game port or a universal serial bus (USB). A monitor 141 or other type of display device is also connected to the system bus 71 via an interface, such as a video interface 140. In addition to the monitor, computers may also include other peripheral output devices such as speakers 147 and printer 146, which may be connected through an output peripheral interface 145.

The computer 60 may operate in a networked environment using logical connections to one or more remote computers, such as a remote computer 130. The remote computer 130 may be a personal computer, a hand-held device, a server, a router, a network PC, a peer device or other common network node, and typically includes many or all of the elements described above relative to the computer 60. The logical connections depicted in FIG. 3 include a local area network (LAN) 121 and a wide area network (WAN) 123, but may also include other networks. Such networking environments are commonplace in offices, enterprise-wide computer networks, intranets and the Internet.

When used in a LAN networking environment, the computer 60 is connected to the LAN 121 through a network interface or adapter 120. When used in a WAN networking environment, the computer 60 typically includes a modem 122 or other means for establishing communications over the WAN 123, such as the Internet. The modem 122, which may be internal or external, may be connected to the system bus 71 via the user input interface 110, or other appropriate mechanism. In a networked environment, program modules depicted relative to the computer 60, or portions thereof, may be stored in the remote memory storage device. By way of example, and not limitation, FIG. 3 illustrates remote application programs 135 as residing on remote computer 130. It will be appreciated that the network connections shown are exemplary and other means of establishing a communications link between the computers may be used.

Figure 4:
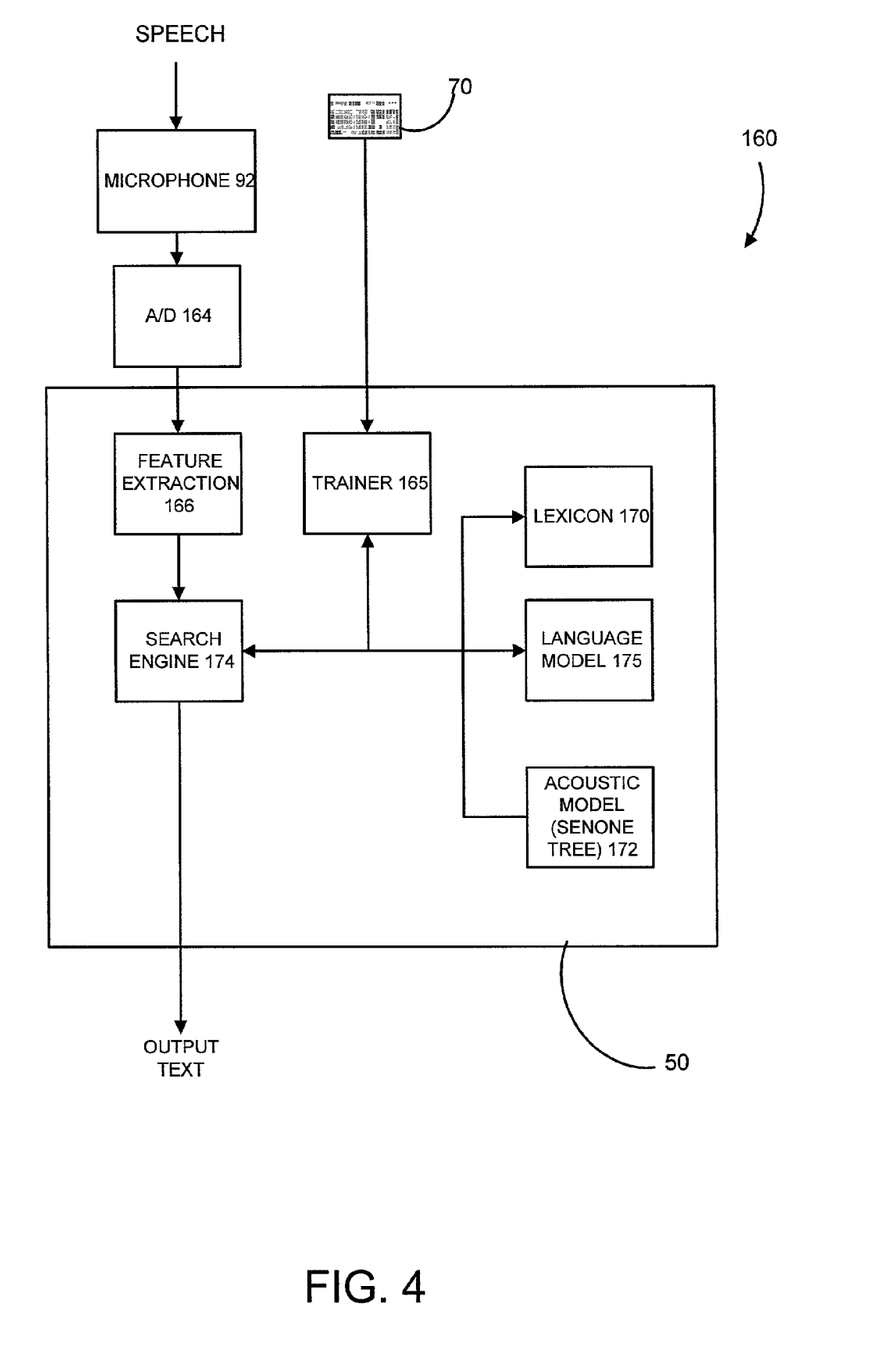
FIG. 4 is a block diagram of a speech recognition system.

The phonetic information obtained in step 12 is commonly provided by a speech recognition system, an exemplary embodiment of which is illustrated in FIG. 4 at 160. Generally, the speech recognition system 160 receives input speech from the user and converts the input speech to text. Commonly, a speech recognition system used in this manner is referred to as a "dictation system". Although the speech recognition system 160 can form a part of a word processing application or a text editing module, it should be understood that the present invention also includes a dictation system that provides only a text file as an output. In other words, one form of a dictation system may not include capabilities for editing the text file other than the correction of ideograms as discussed above.

In the exemplary embodiment, the speech recognition system 160 includes the microphone 92, an analog-to-digital (A/D) converter 164, a training module 165, feature extraction module 166, a lexicon storage module 170, an acoustic model along with senone trees 172, a tree search engine 174, and a language model 175. It should be noted that the entire system 160, or part of speech recognition system 160, can be implemented in the environment illustrated in FIG. 3. For example, microphone 92 can preferably be provided as an input device to the computer 50, through an appropriate interface, and through the A/D converter 164. The training module 165 and feature extraction module 166 can be either hardware modules in the computer 50, or software modules stored in any of the information storage devices disclosed in FIG. 3 and accessible by the processing unit 51 or another suitable processor. In addition, the lexicon storage module 170, the acoustic model 172, and the language model 175 are also preferably stored in any of the memory devices shown in FIG. 3. Furthermore, the tree search engine 174 is implemented in processing unit 51 (which can include one or more processors) or can be performed by a dedicated speech recognition processor employed by the personal computer 50.

In the embodiment illustrated, during speech recognition, speech is provided as an input into the system 160 in the form of an audible voice signal by the user to the microphone 92. The microphone 92 converts the audible speech signal into an analog electronic signal, which is provided to the A/D converter 164. The A/D converter 164 converts the analog speech signal into a sequence of digital signals, which is provided to the feature extraction module 166. In one embodiment, the feature extraction module 166 is a conventional array processor that performs spectral analysis on the digital signals and computes a magnitude value for each frequency band of a frequency spectrum. The signals are, in one illustrative embodiment, provided to the feature extraction module 166 by the A/D converter 164 at a sample rate of approximately 16 kHz.

The feature extraction module 166 divides the digital signal received from the A/D converter 164 into frames that include a plurality of digital samples. Each frame is approximately 10 milliseconds in duration. The frames are then encoded by the feature extraction module 166 into a feature vector reflecting the spectral characteristics for a plurality of frequency bands. In the case of discrete and semi-continuous Hidden Markov Modeling, the feature extraction module 166 also encodes the feature vectors into one or more code words using vector quantization techniques and a codebook derived from training data. Thus, the feature extraction module 166 provides, at its output the feature vectors (or code words) for each spoken utterance. The feature extraction module 166 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

Upon receiving the code words from the feature extraction module 166, the tree search engine 174 accesses information stored in the acoustic model 172. The model 172 stores acoustic models, such as Hidden Markov Models, which represent speech units to be detected by the speech recognition system 160. In one embodiment, the acoustic model 172 includes a senone tree associated with each Markov state in a Hidden Markov Model. The Hidden Markov models represent, in one illustrative embodiment, phonemes. Based upon the senones in the acoustic model 172, the tree search engine 174 determines the most likely phonemes represented by the feature vectors (or code words) received from the feature extraction module 166, and hence representative of the utterance received from the user of the system.

The tree search engine 174 also accesses the lexicon stored in module 170. The information received by the tree search engine 174 based on its accessing of the acoustic model 172 is used in searching the lexicon storage module 170 to determine a symbol or ideogram that most likely represents the codewords or feature vector received from the features extraction module 166. Also, the search engine 174 accesses the language model 175. The language model 175 is also used in identifying the most likely symbol or ideogram represented by the input speech. The possible symbols or ideograms can be organized in a candidate list. The most likely symbol or ideogram from the candidate list is provided as output text. The training module 165 and keyboard 70 are used to train speech recognition system 160.

Although described herein where the speech recognition system 160 uses HMM modeling and senone trees, it should be understood that the speech recognition system 160 can take many forms of hardware and software modules and all that is required is that it provide as an output the text, preferably through the use of a candidate list.

Figure 5:
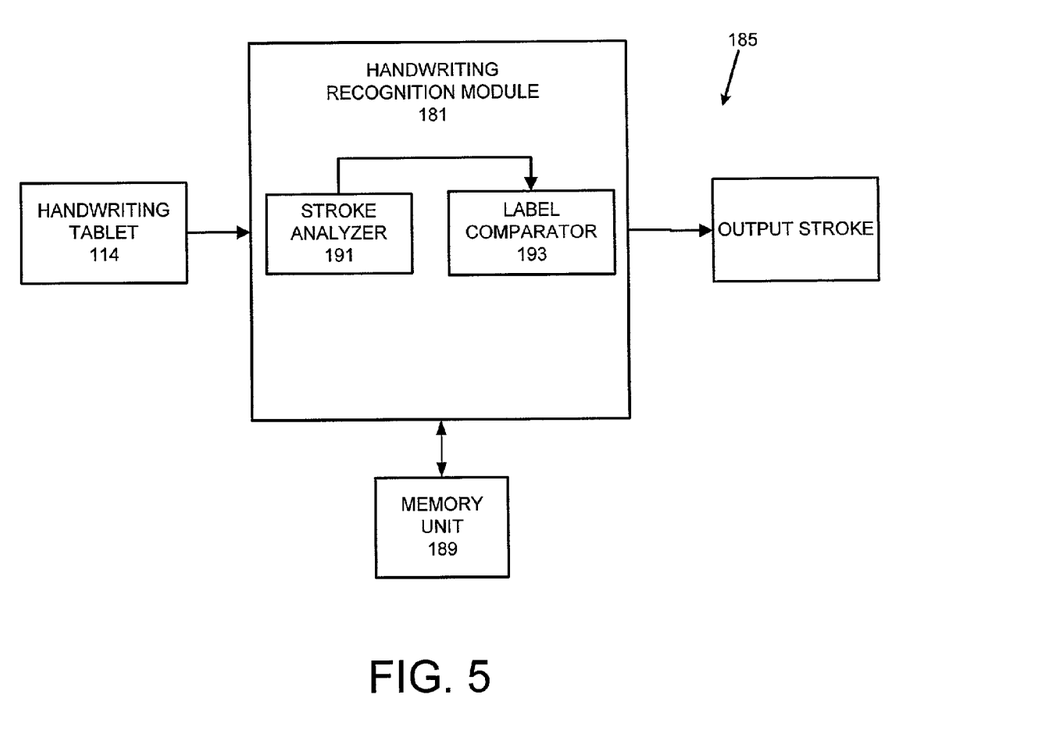
FIG. 5 is a block diagram of a handwriting recognition system.

The stroke information obtained in step 16 is commonly provided by a handwriting recognition module or system, an exemplary embodiment of which is illustrated in FIG. 5 at 181. The handwriting recognition module 181 receives input from the user through the handwriting tablet 114.

Handwriting recognition systems are generally well known. One exemplary embodiment that can be modified to work in the present invention is illustrated in FIG. 5 and is disclosed in U.S. Pat. No. 5,729,629, which is assigned to the same assignee as the present invention. Briefly, a handwriting a recognition system 185 includes the handwriting recognition module 181 coupled to the handwriting tablet 114 that receives handwritten input symbols from a user and displays reference symbols determined by the handwriting recognition module 181 to correspond to the handwritten symbols. The handwriting recognition module 181 is coupled to a memory unit 189 that temporarily stores coordinate information representing features of the input strokes as received from the handwriting tablet 114. The handwriting recognition module 181 includes a stroke analyzer 191 that retrieves the coordinate information from the memory unit 189 and translates the coordinate information for each written feature into a feature code representing one of a predetermined number of feature models stored in the memory unit 189. For purposes of the present invention, the handwriting recognition module 181 does not need to recognize the whole ideogram or symbol, but rather one or more individual strokes contained in the ideograms or symbols, the stroke information being used to separate ideograms or symbols having the stroke(s) from those not having the stroke(s).

The individual stroke feature evaluation is accomplished by a label comparator 193 that compares the feature codes for the inputted stroke with feature codes of reference strokes stored in the memory unit 189 and identifies the reference stroke or strokes having feature codes that most closely match the feature codes of the input stroke. The reference stroke that most closely matches the handwritten inputted stroke, as determined by the label comparator 193 is used to select the desired ideogram as a function of the stroke information at step 18 in FIG. 1 or, with reference to FIG. 2, reduce the candidate list at step 20.

The handwriting recognition system 185 can be implemented on the computer 50, discussed above. The memory unit 189 can include any of the memory devices discussed above, such as the RAM 55, the hard disk drive 57, the removable magnetic disk 59 or a CD for the optical disk drive 60, or accessed through remote computer 130. The stroke analyzer 191, label comparator 193 can be hand wired circuits or modules, but typically are software programs or modules. The handwriting tablet 114 includes an input device, such as a conventional digitizer tablet and pen or an electronic scanner. Generally, the input device provides a series of X-Y coordinate points to define segments of strokes that correspond to continuous motion of the pen on the digitizing table or of the pattern of the symbol as detected by the electronic scanner. The handwriting tablet 114 sends the coordinate points to the memory unit 189 where they are stored while the strokes are being recognized. It should also be noted that the form of the handwriting recognition system 185 can be varied, using other techniques to recognize the inputted stroke(s), without departing from aspects of the present invention. Another suitable system or module for acquiring stroke information and reducing a list of potential ideograms is found in IMEPAD by Microsoft Corporation.

The stroke information can be used in various ways to reduce the candidate list in step 20 of FIG. 2. For example, referring to FIG. 6, a central or main database 170 can be maintained in a computer readable media having data indicative of all of the ideograms or symbols used in a language, and in particular, data indicative of the strokes present in each of the ideograms or symbols. Data indicative of the ideograms or symbols of the candidate list, indicated at 171, are provided to a processing module 173 that identifies corresponding ideograms or symbols, or at least the strokes in the ideograms or symbols of the candidate list 171 using the database 170. As stroke information is received from the user, the processing module 173 accesses the stroke information corresponding to the ideograms of the candidate list 171 in order to eliminate those ideograms or symbols of the candidate list 171 that do not include the strokes identified by the user. The ideograms or symbols of the candidate list 171 are typically rendered (such as illustrated in FIG. 9) to the user through a suitable rendering module 177 as the stroke information is used to reduce the number of symbols so that upon recognition by the user of the desired ideogram or symbol, the user can quickly select the desired ideogram or symbol. In this manner, the user typically will not have to enter all of the strokes of the desired symbol in order to identify the desired symbol.

Figure 6:
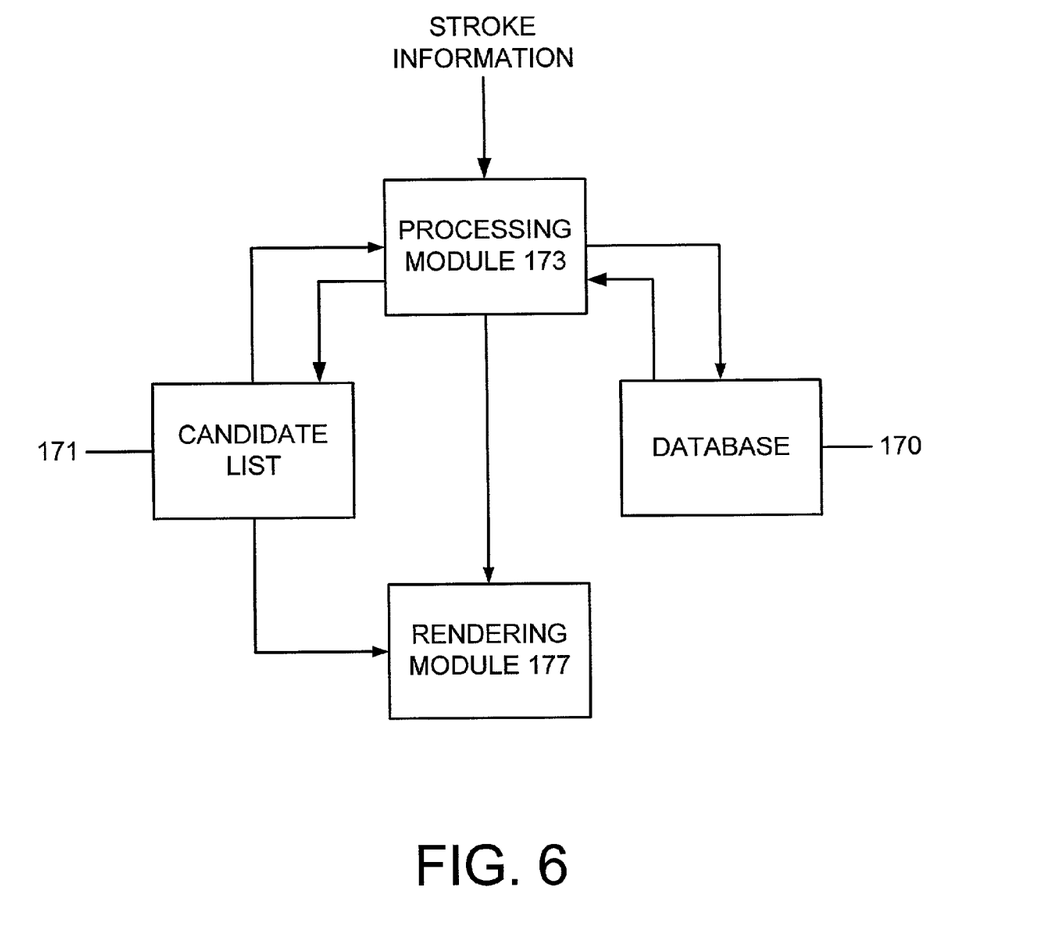
FIG. 6 is a block diagram of modules used for reducing and rendering a candidate list as a function of stroke information.

In some circumstances, the stroke information provided by the user will not correspond to any of the ideograms or symbols of the candidate list 171, which using the technique described above, will eventually cause no ideograms or symbols to be presented to the user for selection. As another aspect of the present invention, rather than requiring the user to manually draw the desired ideogram or symbol, or start from the beginning by re-entering stroke information and comparing it to all of the stroke information contained in the database 170, the processing module 173 can retain all the stroke information already provided by the user and use it to identify at least one, and typically, a plurality of ideograms or symbols having the strokes so far entered. The identified ideograms or symbols can form, in effect, a new candidate list 171, which again is further reduced with further stroke information provided by the user until the desired ideogram or symbol is selected.

Figure 7:
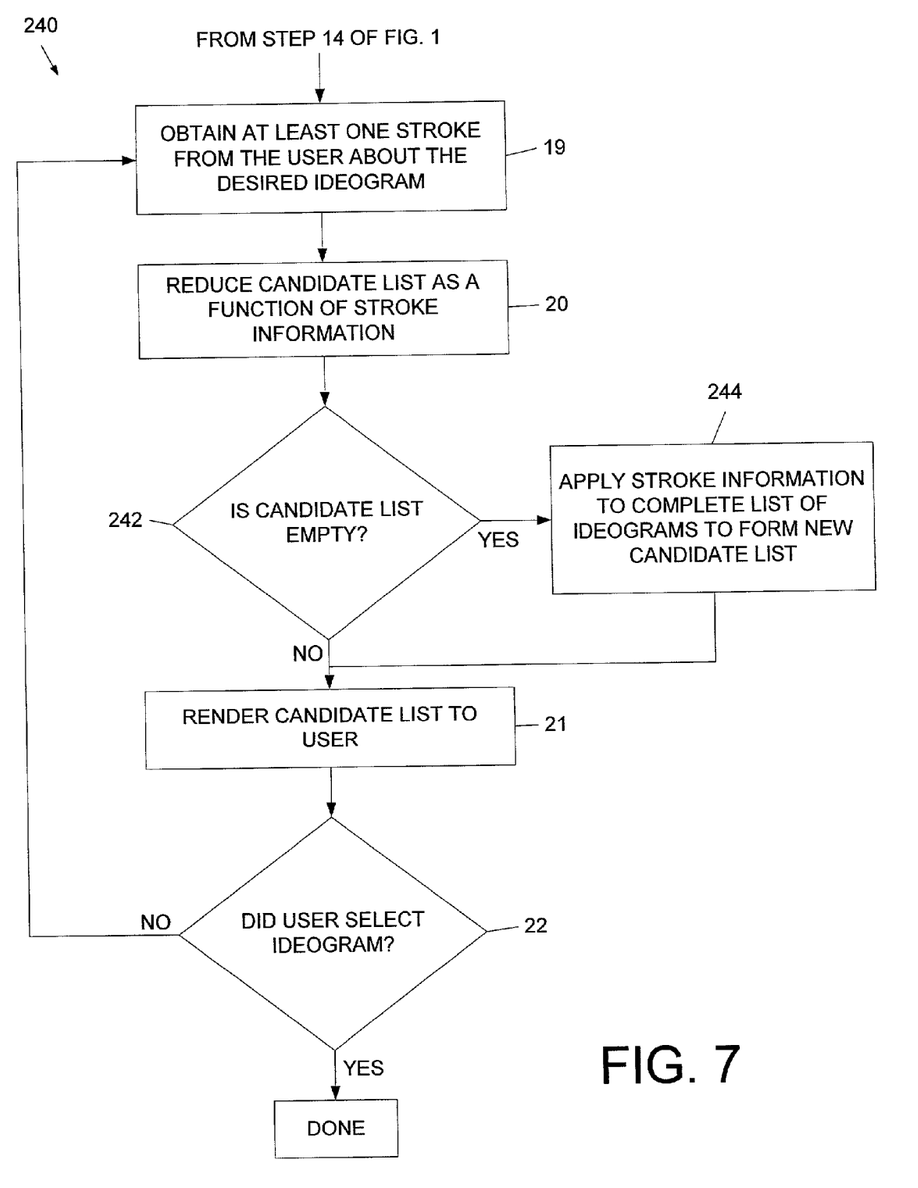
FIG. 7 is a flow chart illustrating a method of operation according to an alternative embodiment of the present invention.

This aspect can be achieved through use of method 240 illustrated in FIG. 7. Method 240 illustratively operates similar to the method described in FIG. 2, and similar elements are similarly numbered. In this method, step 242 is added after step 20 to check whether the candidate list is empty. If there are entries in the candidate list, the method proceeds to step 21 as previously described. If the candidate list is empty, the method 240 proceeds to step 244. In step 244, the stroke information previously entered by the user is applied to the complete list of ideograms. The ideograms having similar stroke information form part of a new candidate list 171. This list is then rendered to the user at step 21 and the method proceeds as described with regard to FIG. 2. Further iterations of the method, wherein the user is asked for additional stroke information, may be used to further reduce the new candidate list 171, if desired.

From the user's point of view, transition from the candidate list initially identified from phonetic information to a candidate list based solely on stroke information is smooth although typically noticeable because the candidate list 171 will appear to shrink in number as stroke information is entered and then suddenly expand when all of the candidates of the initial list have been eliminated. A further benefit of this technique allows the easy correction of recognition errors (where none of the initial ideograms or symbols of the candidate list are correct) because all the ideograms or symbols of the database 170 can be accessed based on stroke information, if needed.

Figure 8:
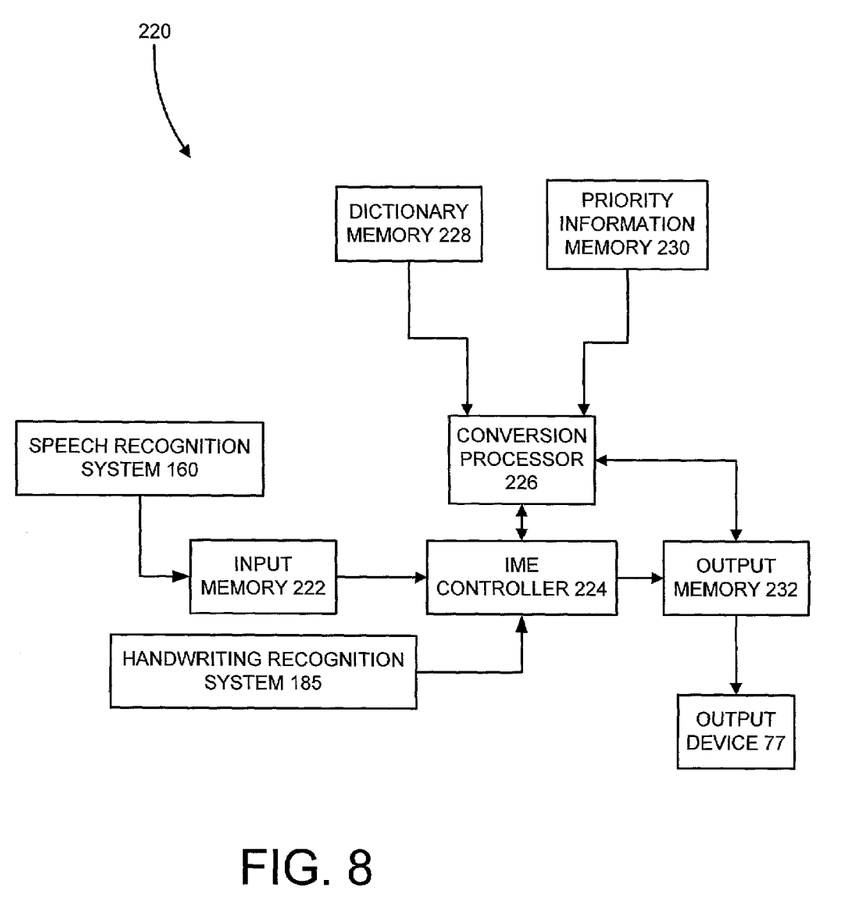
FIG. 8 is a block diagram of an exemplary processing system.

FIG. 8 is a block diagram illustrating an exemplary processing system or text editing system 220 used in a Japanese IME system. System 220 includes a speech recognition system such as the speech recognition system 160 described above to enter phonetic information, and a system for inputting stroke information such as the handwriting recognition system 185 discussed above.

Phonetic information provided by the speech recognition system 160 is stored in input memory 222 and transferred from input memory 222 to a conversion controller 224. If Romaji phonetic symbols are provided by the speech recognition system 160, the symbols are first processed using a conversion processor 226 to convert the Romaji phonetic symbols to Kana characters. The conversion processor 226 accesses dictionary data stored in memory 228 converting the Romaji phonetic symbols to Kana characters.

The Kana data is then segmented into predetermined processing units, for example, into units of words or clauses under the control of conversion processor 226. The segmented data is then subjected to Kana-Kanji conversion processing. The conversion processor 226 uses dictionary data also stored in the memory 228 for Kana-Kanji conversion. If a plurality of Kanji forms correspond to one sequence of Kana symbols, the conversion processor 226 can select the most likely one from the candidate list as a conversion result determined by the language models (usually implemented by a N-gram language model, like the word trigram language model 175 in the exemplary embodiment of the speech recognition system illustrated in FIG. 4) stored in memory 230. If the selected symbol is determined to be incorrect by the user, stroke information can be entered using the handwriting recognition system 185 as discussed above to eventually select the correct ideogram or symbol, wherein the IME controller 224 functions as the processing module 172 and the output memory 232 and the output device 77 are used to render the candidate list 171.

It should also be noted that stroke information can also be entered through other devices besides the handwriting recognition system 185. For instance, a keyboard having keys indicative of all the strokes present in the ideograms could also be used. This type of system could be beneficial since actuating a key representative of a particular stroke eliminates the need to recognize the stroke based on the user's writing. This type of input is used in Chinese IME systems where Wu-Bi is stroke information and the phonetic information comprises Pinyin symbols.

Although the present invention has been described with reference to preferred embodiments, workers skilled in the art will recognize that changes may be made in form and detail without departing from the spirit and scope of the invention.

What is claimed is:

1. A computer-implemented method for inputting ideograms into a computer system, the method comprising:
   receiving phonetic information from input speech related to a desired ideogram to be entered;
   forming a candidate list of possible ideograms as a function of the phonetic information received;
   receiving stroke information related to the desired ideogram, wherein the stroke information comprises at least one stroke present in the desired ideogram, wherein receiving stroke information comprises receiving stroke information from handwritten input;

using the stroke information to obtain the desired ideogram from the candidate list, wherein using the stroke information comprises removing from the candidate list ideograms not having a stroke corresponding to the stroke information;

rendering the ideograms of the candidate list to the user;

receiving input related to a selected ideogram from the candidate list as a function of the rendered ideograms, wherein the sequence of steps of receiving stroke information related to the desired ideogram, removing from the candidate list ideograms not having a stroke corresponding to the stroke information, and rendering the ideograms of the candidate list to the user are repeated until the input related to the selected ideogram is received; and further comprising if the number of candidates in the candidate list is reduced to zero by repeated execution of the sequence of steps, adding at least one new ideogram candidate to the candidate list, wherein said at least one new ideogram candidate is obtained as a function of the stroke information.

2. The computer-implemented method of claim 1, wherein adding at least one new ideogram candidate to the candidate list comprises adding at least one new ideogram candidate to the candidate list only as a function of the stroke information.

3. A computer-implemented method for inputting ideograms into a computer system, the method comprising:

receiving phonetic information from input speech related to a desired ideogram to be entered;

forming a candidate list of possible ideograms as a function of the phonetic information received;

receiving stroke information related to the desired ideogram, wherein the stroke information comprises at least one stroke present in the desired ideogram, wherein receiving stroke information comprises receiving stroke information from handwritten input;

using the stroke information to obtain the desired ideogram from the candidate list, wherein using the stroke information comprises removing from the candidate list ideograms not having a stroke corresponding to the stroke information;

rendering the ideograms of the candidate list to the user;

receiving input related to a selected ideogram from the candidate list as a function of the rendered ideograms, wherein the sequence of steps of receiving stroke information related to the desired ideogram, removing from the candidate list ideograms not having a stroke corresponding to the stroke information, and rendering the ideograms of the candidate list to the user are repeated until the input related to the selected ideogram is received; and further comprising if the number of candidates in the candidate list is reduced to zero by repeated execution of the sequence of steps, adding a plurality of new ideogram candidates to the candidate list, wherein each of the new ideogram candidates is obtained as a function of the stroke information.

4. The computer-implemented method of claim 3 wherein adding a plurality of ideogram candidates to the candidate list comprises adding each of the ideogram candidates to the candidate list only as a function of the stroke information.

5. The computer-implemented method of claim 3, wherein receiving phonetic information comprises recognizing audible speech of the user.

6. The computer-implemented method of claim 5 wherein receiving stroke information comprises recognizing individual strokes handwritten by the user.

7. A computer readable media having instructions, which when executed by a computer, cause the computer to perform steps comprising:

forming a candidate list of candidates related to ideograms as a function of phonetic information received from input speech;

reducing the number of candidates in the candidate list as a function of stroke information until a candidate is selected; and if the number of candidates in the candidate list is reduced to zero, adding a plurality of new candidates to the candidate list, each candidate of the plurality of new candidates being selected as a function of the stroke information.

8. The computer readable media of claim 7, wherein reducing the number of candidates comprises receiving signals indicative of keys actuated on a keyboard, the keys being indicative of stokes used in ideograms.

9. The computer readable media of claim 7 and further comprising instructions, which when executed by a computer, cause the computer to perform a step comprising:

rendering candidates of the candidate list to the user.

10. The computer readable media of claim 9, wherein reducing the number of candidates in the candidate list comprises:

receiving handwritten stroke information; and removing from the candidate list candidates of ideograms not having a stroke corresponding to the stroke information.

11. A computer readable media having instructions, which when executed by a computer, comprise:

a speech recognition module for receiving input speech and providing phonetic information related to a desired ideogram to be entered, the phonetic information being used to form a candidate list of a plurality of candidates, each candidate being a possible ideogram corresponding to the phonetic information;

a processing module receiving stroke information indicative of strokes contained in the desired ideogram, the processing module using the stroke information to reduce the number of candidates in the candidate list, wherein the processing module removes from the candidate list candidates corresponding to ideograms not having a stroke corresponding to the stroke information; and a rendering module to render ideograms corresponding to the candidates in the candidate list and receiving an input corresponding to a selected candidate from the candidate list; and instructions for receiving stroke information, wherein the processing module repeatedly removes from the candidate list candidates corresponding to ideograms not having individual strokes corresponding to the stroke information as the individual strokes are received, wherein the processing module adds a plurality of new candidates to the candidate list if the candidate list is reduced to zero, each candidate of the plurality of new candidates being selected as a function of the stroke information.

12. The computer readable media of claim 11, and further comprising instructions, which when executed by the computer, comprise a handwriting recognition module for recognizing strokes made by hand by the user.

13. The computer readable media of claim 11, and further comprising instructions, which when executed by the computer, comprise receiving data indicative of actuation of keys corresponding to strokes in ideograms.

* * * * *